(12) United States Patent
Tannenbaum (10) Patent No.: US 11,402,967 B1
(45) Date of Patent: Aug. 2, 2022

(54) SYSTEM AND METHOD FOR SELECTIVELY PERSONALIZING ELECTRONIC GAMES AMONG RECIPIENTS

(71) Applicant: Union Beach L.P., Dallas, TX (US)

(72) Inventor: Mary C Tannenbaum, Dallas, TX (US)

(73) Assignee: Union Beach L.P., Dallas, TX (US)

( * ) Notice: Subject to any disclaimer, the term of this patent is extended or adjusted under 35 U.S.C. 154(b) by 0 days.

(21) Appl. No.: 16/734,765

(22) Filed: Jan. 6, 2020

Related U.S. Application Data (63) Continuation of application No. 12/581,650, filed on Oct. 19, 2009, now Pat. No. 10,585,556.

(51) Int. Cl.
*G06F 3/0482* (2013.01)

(52) U.S. Cl.
CPC ................ *G06F 3/0482* (2013.01)

(58) Field of Classification Search
CPC ...................................... G06F 3/0482
See application file for complete search history.

(56) References Cited

U.S. PATENT DOCUMENTS

| 6,816,159 B2 | 11/2004 | Solazzi |
| 6,981,214 B1 * | 12/2005 | Miller ................ G06F 3/1287 715/234 |
| 7,444,588 B2 | 10/2008 | Hill et al. |
| 2003/0107570 A1 * | 6/2003 | Solazzi ................ G06T 17/20 345/420 |
| 2006/0195787 A1 * | 8/2006 | Topiwala ......... H04N 21/41407 715/700 |

* cited by examiner

*Primary Examiner* — Andrey Belousov
(74) *Attorney, Agent, or Firm* — Norton Rose Fulbright US LLP (57) ABSTRACT

By allowing a person to customize an otherwise common media prior to delivery of the media to a recipient on a regular basis it is possible to deliver professionally created media in a personalized manner. In one embodiment, a magazine subscription is delivered monthly to a recipient and the cover (centerfold, back page) contains content provided by the initiator. In another embodiment, video media delivered to the recipient is created by a professional as a universal offering but content, such as photos, videos, text, is added by the initiator prior to delivery.

18 Claims, 6 Drawing Sheets

GENERIC MAGAZINE

FIG. 2B

PERSONALIZED FOR
RECIPIENT R01 (BY INITIATOR I01)

FIG. 2C

PERSONALIZED FOR
RECIPIENT R0N (BY INITIATOR I02)

FIG. 3A

GENERIC MAGAZINE

FIG. 3B

PERSONALIZED FOR RECIPIENT R02 (BY INITIATOR I01)

| RECIPIENT | INITIATOR | PROFILE | UNIVERSAL MEDIA | REPETITIVE PERSONAL MEDIA | NEXT ISSUE PERSONAL MEDIA |
|---|---|---|---|---|---|
| R01 | I01 | F, 16, J, NA, | TEEN MAGAZINE | PICTURE OF GRANDMA | NEW DOG |
| R02 | I01 |  | AGE 7 MAGAZINE | PICTURE OF GRANDMA | NEW CAT |
| ⋮ | ⋮ | ⋮ | ⋮ | ⋮ | ⋮ |
| R0N | I02 |  | TEEN MAGAZINE | PICTURE OF FAMILY | — |
| R01 | I02 |  | FALLING STARS | — | DOG, CAT, PICTURE OF RECIPIENT R01 |

FIG. 8

SYSTEM AND METHOD FOR SELECTIVELY PERSONALIZING ELECTRONIC GAMES AMONG RECIPIENTS

CROSS-REFERENCE TO RELATED APPLICATIONS

The present application is a continuation of U.S. patent application Ser. No. 12/581,650 filed Oct. 19, 2009 and entitled, "SYSTEM AND METHOD FOR PERSONALIZING A COMMONLY DISTRIBUTED PUBLICATION," and is related to U.S. patent application Ser. No. 16/734,703 filed concurrently herewith and entitled, "SYSTEM AND METHOD FOR DELIVERING SPECIFIC MEDIA TOGETHER WITH COMMON MEDIA TO SPECIFIC RECIPIENTS," the disclosures of which are incorporated by reference herein in their entirety.

BACKGROUND OF THE INVENTION

There are many situations in which one person wishes to send another person a gift on a regular basis. One such situation occurs when families are forced by circumstances to live at separate locations. Thus, a parent, or in a more common scenario, a grandparent, living remote from a grandchild might want to be in communication with his/her child or grandchild on a regular basis.

Currently, such communication can be by phone conversation (verbally or by text), by e-mail, pen and paper, social networking (such as Facebook). For the most part these communications tend to be one-off, in that each is an independent act and requires one or both parties to have the mental or physical capabilities to communicate in this fashion. Certainly, some people are better at such communication than are others.

However, many situations exist where the remote parent/grandparent/friend wishes to be in periodic communication with a loved one but find it difficult, for one reason or another, to connect on a satisfying communication medium. One inhibiting factor often is the fact that the potential initiating person (initiator) does not know what content is age (or situation) appropriate for the recipient.

Professionals are in the business of creating media content that is age (or situation) appropriate. Such media comes in the form of games, videos, magazines and internet postings (such as blogs). These media formats have a universal trait, namely, they are common (and thus impersonal) across the age (or situation) group to whom they are designed to resonate with. For example, assume a grandparent wishes to send a magazine to a seven year old grandchild. Two problems exist. First, what magazine is appropriate for that age group? This problem is solvable with a bit of research and perhaps conversation with the recipient or with the recipient's guardians. But then the problem arise that the magazine will arrive monthly and while it might make a great gift, it is not necessarily connected to the initiator. Thus, in situations where the initiator wishes to establish a connection (or bonding) with the recipient, an impersonal gift of the month (such as a magazine subscription) is hardly the proper vehicle.

BRIEF SUMMARY OF THE INVENTION

By allowing a person to customize an otherwise common media prior to delivery of the media to a recipient on a regular basis it is possible to deliver professionally created media in a personalized manner. In one embodiment, a magazine subscription is delivered monthly to a recipient and the cover (centerfold, back page) contains content provided by the initiator. In another embodiment, video media delivered to the recipient is created by a professional as a universal offering but content, such as photos, videos, text, is added by the initiator prior to delivery.

In one embodiment, a monthly subscription is entered into by the initiator for the delivery of professionally created content to a recipient. Every month, prior to publication, the creator receives input from every initiator, perhaps in response to a request by the publisher, and the received media from each initiator is then incorporated into the product delivered to that initiator's recipient. The media from each initiator can be random, or it can be geared to a theme of the next publication.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
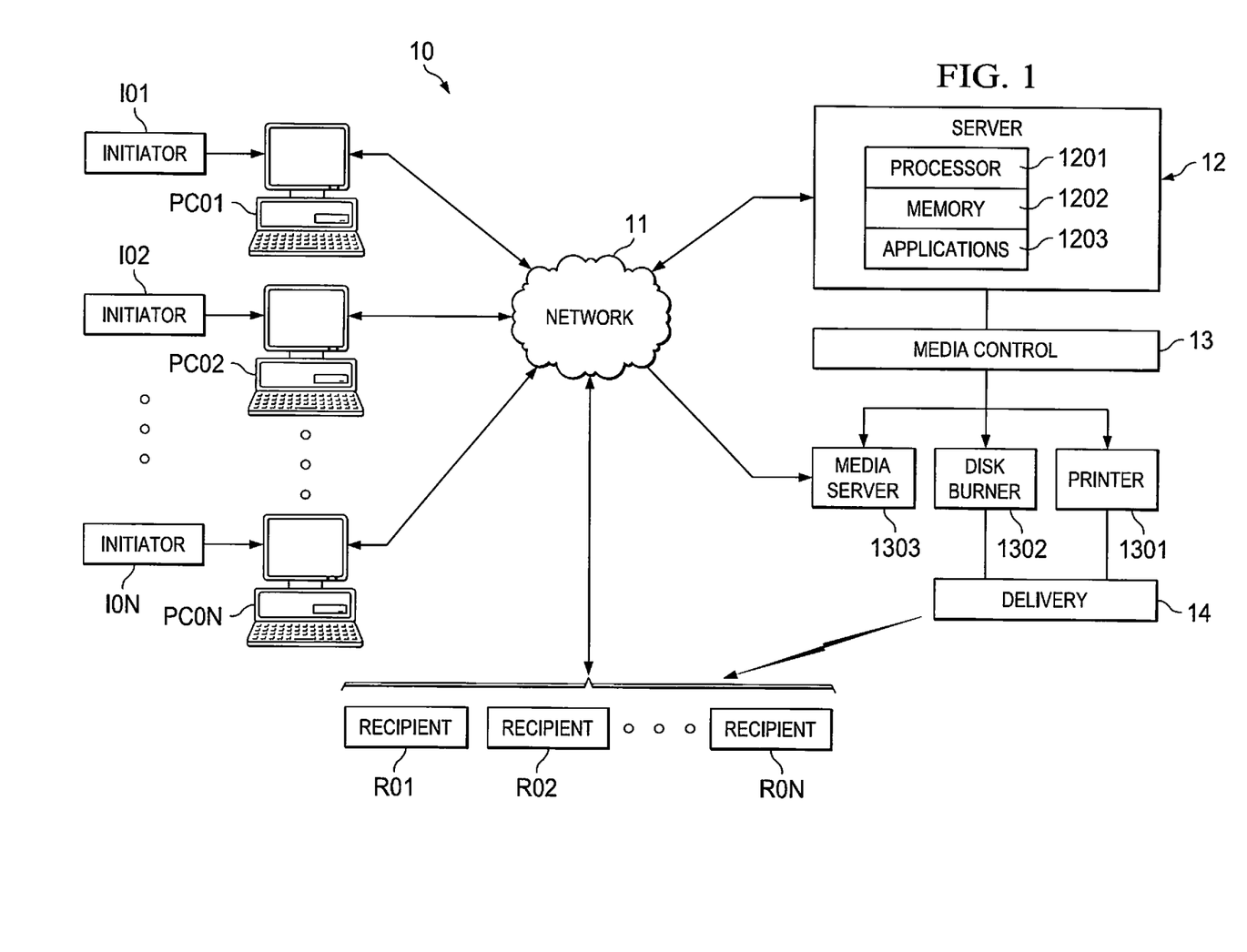
FIG. 1 illustrates one embodiment of a system and method for personalizing universal content media prior to delivery to a recipient.

FIG. 1 illustrates one embodiment 10 of a system and method for personalizing universal content media prior to delivery to a recipient. As shown, a plurality of individual initiators I01 to I0N using, for example PCs PC01 to PC0N, communicate with server 12 via network 11 in order to deliver media personal to each initiator. As will be seen, in one embodiment the personal data received from each initiator is stored in a database, such as database 60 (FIG. 6) in memory 1202 under control of an application, such as application 1203 running under control of processor 1201. In association with each initiator is one or more recipients, such as recipients R01 to R0N, who will ultimately have delivered or made available to them media (such as a printed magazine, a news letter, a game or a server logon ID, etc.) which, while intended for mass distribution is nonetheless modified by the received personal media from the initiator (or initiators) associated with the recipient. In this manner, an initiator can cause to be delivered to a particular specified recipient universally distributed media while also having that media personalized prior to delivery.

In one embodiment, when it is time for distribution of the media, such as a magazine or a game, server 12 (or any other control) sends the universal (common) media to medial control 13 for subsequent delivery to the various recipients. Prior to delivery to the recipient (at least in one embodiment) the media that is to be personalized for that particular recipient has inserted therein the personalized media previously received from (or identified by) the initiator(s) associated with that particular recipient. Media control then directs the printing of the magazine via printer 1301 or burns a disk via burner 1302 or in some situations by email or other electronic The media is then delivered via delivery service 14, which can be a terrestrial mail delivery service. In some situations the media will be available to the recipient on-line, for example, via media server 1303 and either requested by or pushed to the recipient.

Figure 2A:
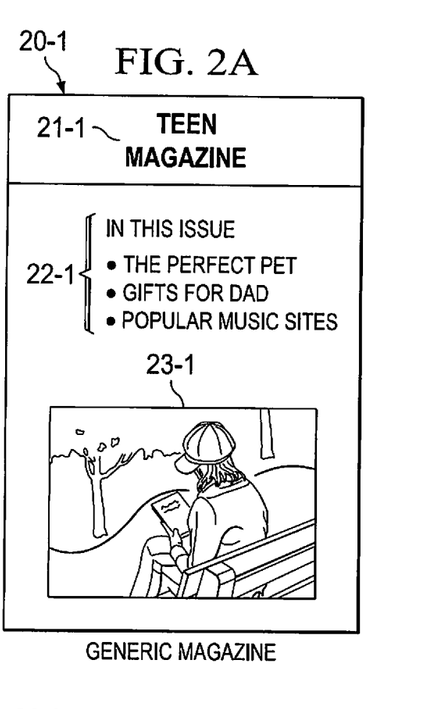
FIGS. 2A-2C illustrate embodiments of magazines deliverable to recipients.
Figure 2B:
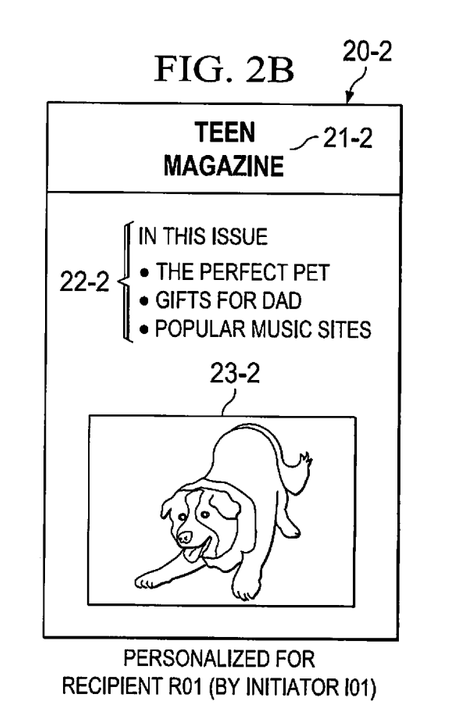
Figure 2C:
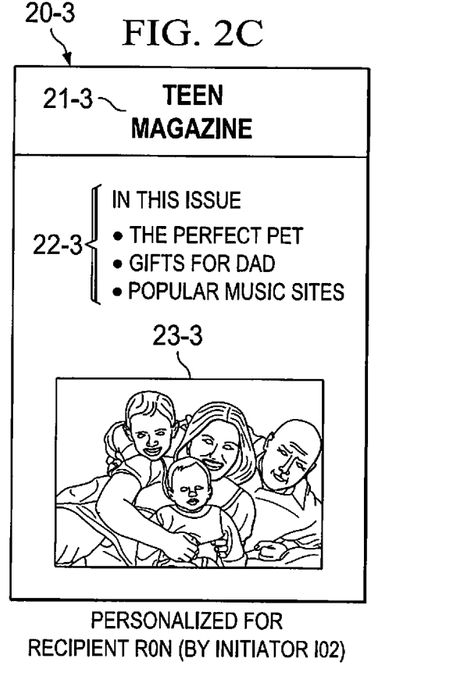

FIGS. 2A-2C illustrate embodiments of magazines deliverable to recipients. FIG. 2A shows a generic professionally constructed magazine 20-1 geared to the teen market, called TEEN MAG 21-1. This magazine is deliverable, usually by subscription, to a plurality of teenagers and the content, such as the content partially recited in cover index 22-1, contained in each issue of the magazine is geared to all subscribers in common. In the issue shown, the cover contains generic media, such as picture 23-1.

FIG. 2B shows the same magazine, namely TEEN MAG 20-2, except that this magazine is destined for delivery to recipient R01 at the initiation of initiator I01. The common content is the same, as for generic magazine 20-1, as shown by cover index 22-2, but generic picture 23-1 has been replaced by media sent by initiator I01. In this situation, the customized picture is of grandpa's new dog. Note that the customizable material could come from the initiator directly, or could come from a site remote from the initiator pointed to by the initiator. As will be discussed, prior to publishing this issue of the magazine, the publisher could have sent a message to each initiator soliciting customizable media for use in this (or future) issues. The publisher could have sent along parameters for the media, such as physical size, theme, etc, or could have provided a web site for each initiator to access and fill in blanks to create the desired media. Also note that the customization is not limited to any specific place in the magazine but could be any place and could be multiple customizations. Also, the initiator could, if desired, be given the opportunity to selected which portion of the "common" material is to be distributed. In such a situation, the initiators could be told which possible articles are available for a particular issue and then that initiator could select which article (or advertisement, etc.) is printed in the distributed media.

FIG. 2C shows magazine 20-3 customized for recipient R0N under control of initiator 102. In this instance, recipient R0N will see a picture 23-3 of recipient's entire family, instead of generic picture 23-1.

Figure 3A:
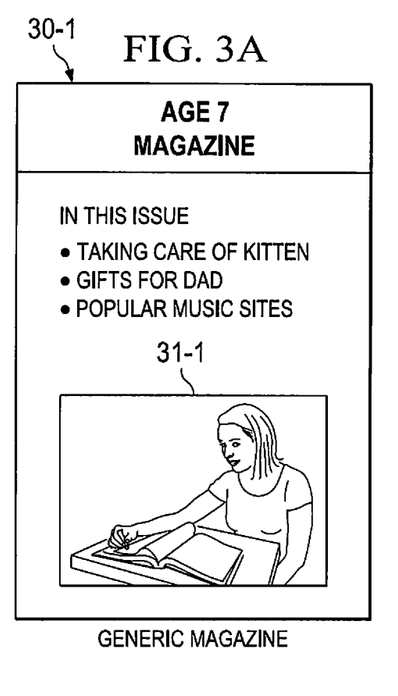
FIGS. 3A-3B illustrate additional embodiments of magazines deliverable to recipients.
Figure 3B:
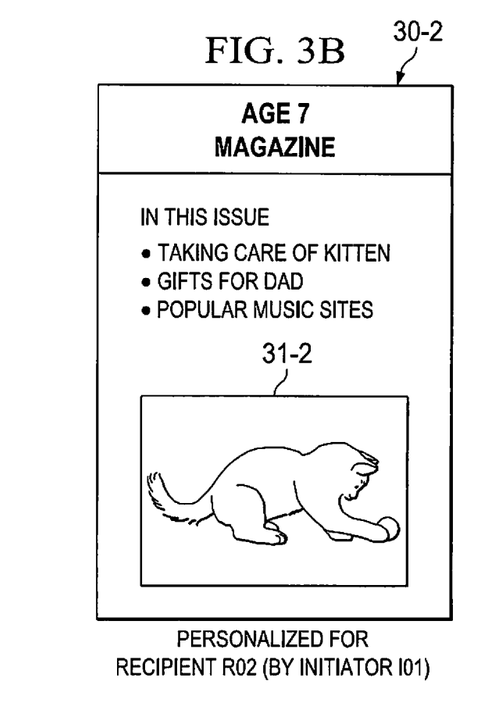

FIGS. 3A and 3B illustrate a magazine common to seven year olds. FIG. 3A shows generic AGE 7 MAG magazine 30-1 having universal content suitable for seven year olds and having generic media 31-1 on the cover.

FIG. 3B shows AGE 7 MAG 30-2 customized for recipient R02 by initiator I01. Generic media 31-1 has been replaced by personalized media 31-2, which in this case is a picture of the initiator's new cat. Note that while pictures are being used in the embodiment, any media would work, including pictures, text, sound, and perhaps smell (digitized and delivered in the same manner as any other media). As will be discussed hereinafter, the personalized media is stored in database 50 (FIG. 5) in an association between initiator and recipient.

Figure 5:
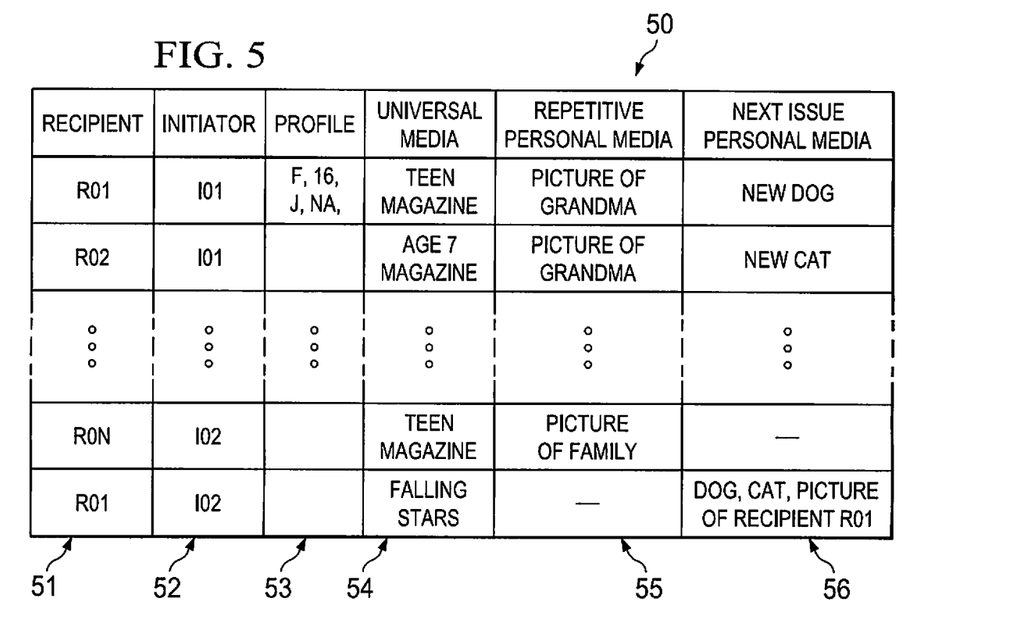
FIG. 5 shows one embodiment of a database for storing relationships and associations between initiators, recipients and desired personalization media.

In some embodiments a recipient profile can be established such that the recipient, or the initiator, could establish profile elements that can be stored in a database, such as in database 50, and these profile elements could be used by the publisher from time to time to change certain of the content for the recipient. For example, religious preferences (or age or any other profile element) could be one profile element and the publisher then would use that element to adjust articles or content to suit the various different recipients.

Thus, in such a scenario the December issue of a magazine could have articles tailored to a recipients religious preferences, such that Christian recipients would have recopies for Christmas dinner (or articles on Christmas) while the content for Jewish preference recipients would be geared around Chanukah. The recipient preference would be determined by the profile element(s) of each recipient. In some situations it might be appropriate to adjust the advertizing and/or the substantive content based on each recipient's preferences, would could include gender, age, religion, as well as more personal preferences, such as non-alcohol user, political preferences, nationality, etc. The use of profiles can also work well for games and other media where certain content is adjusted for a group of recipients based upon a common thread among a number of profiles.

Figure 4A:
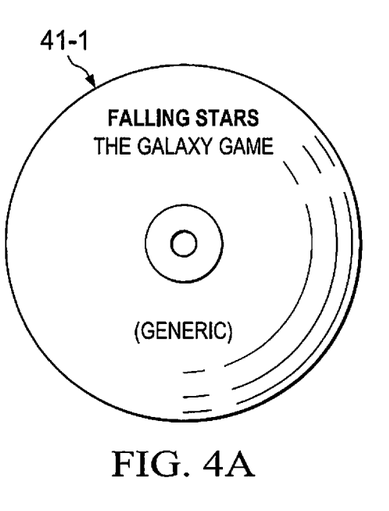
FIGS. 4A and 4B illustrate that other media can be personalized as well as magazines.
Figure 4B:
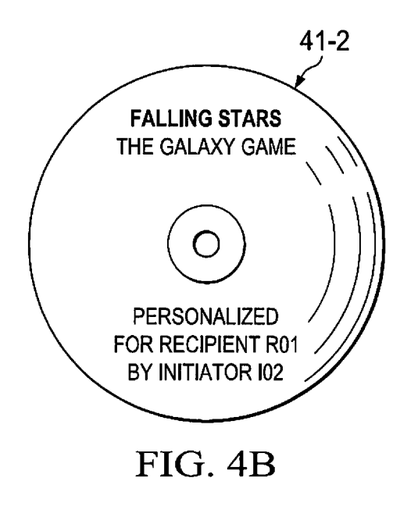

FIGS. 4A and 4B illustrate that other media can be personalized as well as magazines. FIG. 4A shows a generic game 41-1 and FIG. 4B shows the same mass distributed game personalized for recipient R01 by initiator 102. In this case the customizable media may be video as well as static pictures or text. The added media might even allow for the substitution of family or other favorite characters for characters or objects in the game. For example, assume that the game has falling stars that need to be blown up in order to survive. The stars could have the face of the family cat thereon. The family dog might be cast as the "savior" in the version of the game personalized for recipient 102.

FIG. 5 shows one embodiment 50 of a database for storing relationships and associations between initiators, recipients and desired personalization media. Some of the media stored (or identified), for example in column 55, is media that will be used repetitively for more than one issue of the delivered media. Media identified in column 56 is for a particular upcoming issue and will be used only once. As discussed above, this media can take any form suitable for the publication. Column 54 identifies the universal media, such as the magazine, game, etc that is to be delivered to a wide range of people. Columns 51 and 52 contain the associations between initiators and recipients and column 53 contains the recipients profile information, if desired. As shown, recipient R01 has profile elements f (female), 16 (age 16) and J (Jewish) and NA (no alcohol). Note that the recipient need not be Jewish to have a Jewish profile if the recipient (or the initiator for the recipient) desires for the recipient to have Jewish content. In some situations, the recipient profile will be marked with what the recipient does not desire to see instead of what the recipient desires to have sent. Thus, a recipient may desire to have the December issue of a magazine contain all of the possible religious celebrations and not just a single religious theme.

Note that a recipient may have many initiators and vice versa. In some situations, more than one initiator may desire to personalize the same media for a given recipient. In some situations this is allowable and in others it might be prevented. Also note that a recipient can be his/her own initiator.

Figure 6:
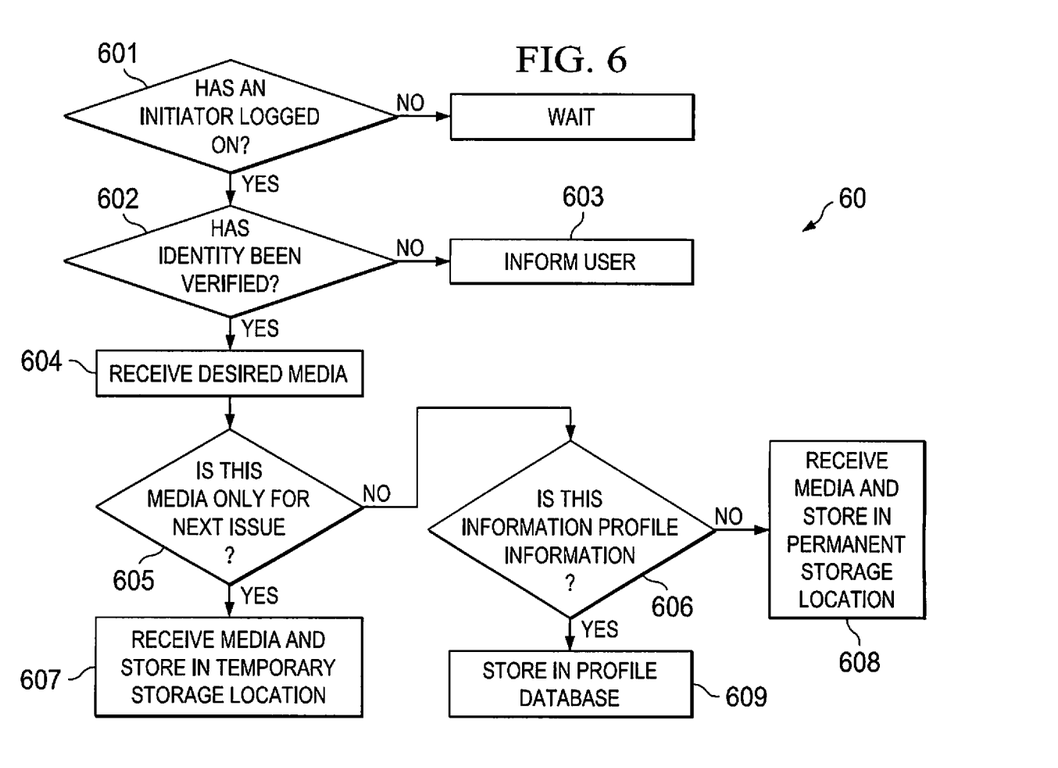
FIGS. 6, 7 and 8 show embodiments of methods used to control the concepts discussed here.

FIG. 6 shows on embodiment 60 of a method for receiving media from an initiator. The methods discussed herein can be run, for example, as part of applications 1203 under control of processor 1201. Process 601 determines if an initiator has logged onto the system. If so, processes 602 and 603 verify the proper identity of the person logged on. If all is proper, then process 604 controls the receipt of the desired media from the initiator.

Process 605 determines if this media is for the next issue only (one-time media) or for recurring use. If the information is for a one-time use then it is stored in a temporary database, such as indicated by column 56 shown in FIG. 5 as controlled by process 607. If the input is to be used for multiple issues, or if the input is profile information, then process 606 controls the storage in more permanent databases via process 608 (column 55) and process 609 (column 53). Note that any database or set of databases can be used for such storage until the information is needed for a particular issue of the media.

Figure 7:
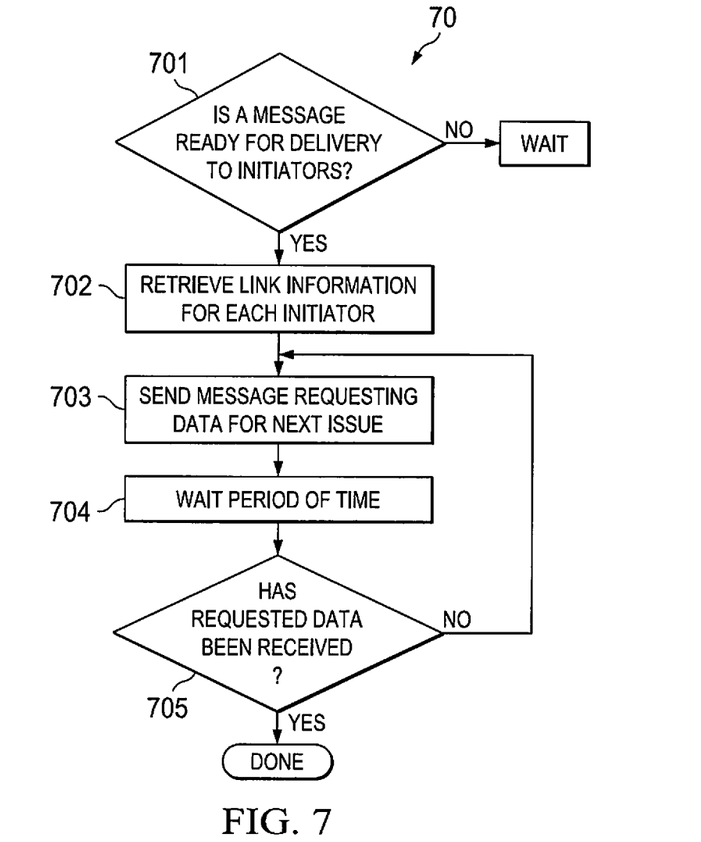

FIG. 7 shows an embodiment 70 of a method for informing initiators that it is time to provide personalized media. Process 701 determines if a message is ready for delivery to initiators. When it is time to obtain media input from initiators, process 702 retrieves the link or network address of each initiator and sends a message by email, text or any other electronic method. Process 702 can, if desired, from time to time, provide anticipated common media to one or more initiator so that the initiator can select from among a number of possible medias for inclusion in an upcoming delivery. For example, there can be ten possible articles that could appear in the December issue and the initiator could select which articles his/her recipients will actually receive. This selection can be in addition to the personal message media and data that the initiator can also include in the December distribution. Using the link information, process 703 sends the respective messages and processes 704 and 705 continues such sending until all known initiators, or their allowed designees, have been sent messages or the required input has been received or the deadline has passed.

Figure 8:
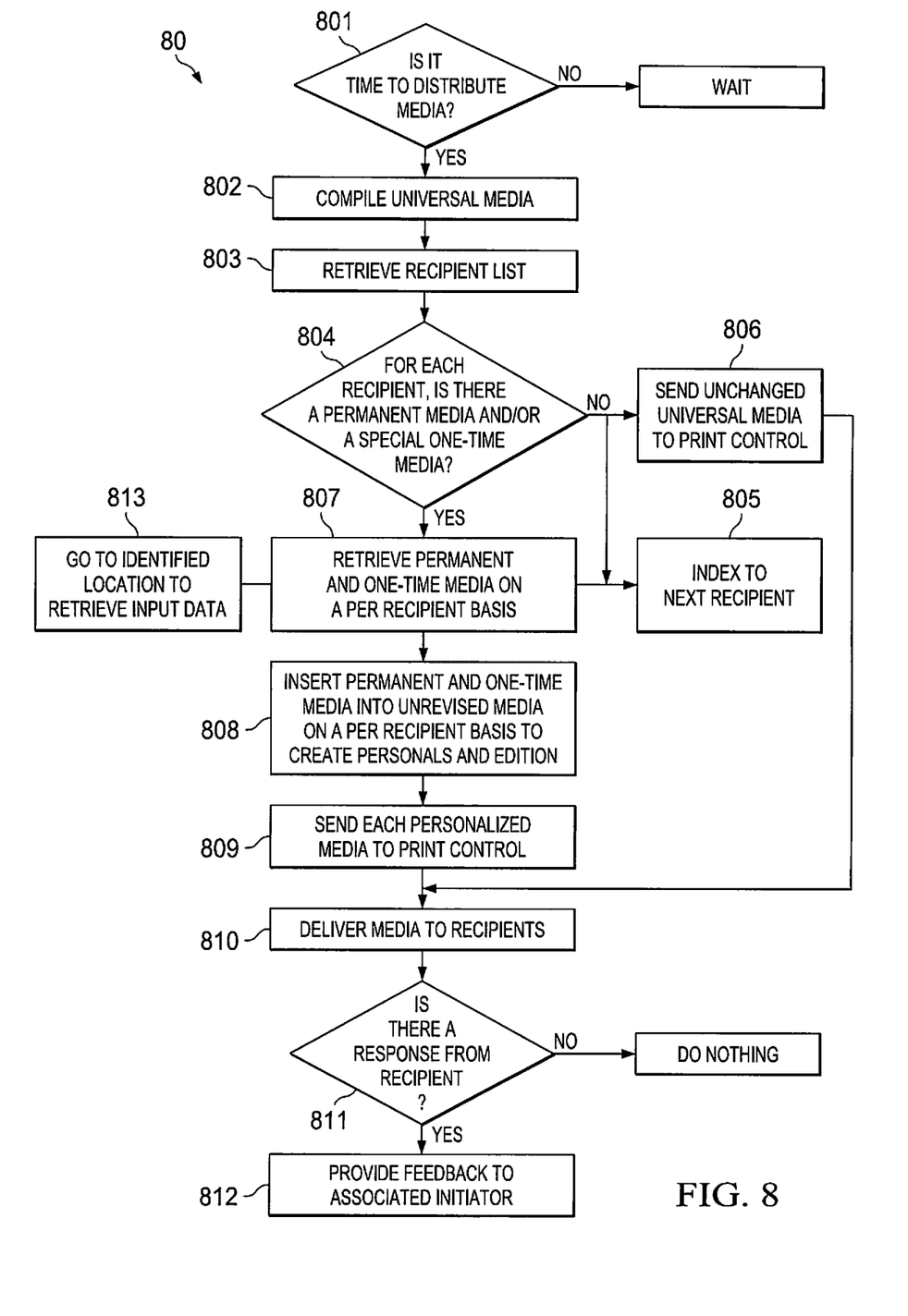

FIG. 8 shows one embodiment 80 of a method for controlling personalized delivery of otherwise universal media. Process 801 determines if it is time to distribute media. When the time is right, process 802 compiles the universal. This may be done over a period of time but at some point the media is ready for distribution except for the personalized information. At that point in time, process 803 retrieves the entire recipient list for the issue being prepared.

Process 804 determines for each recipient if there is customizable material and/or profile information that pertains to this next issue or release that needs to be used in the preparation of the next distribution. If not, process 806 sends the universal generic material to print control and concurrently, process 805 indexes to the next recipient. If there is profile information then the profile information is used to control the generic content material as discussed above.

When a recipient is shown as having available personalized media, or when the initiator has selected certain media from among a selection of common media, process 807 retrieves both the one-time media and the repetitive media from database 50 (FIG. 5) and process 808 inserts the retrieved media in the proper locations within the generic media. In some situations this inserted material will replace material already in the generic version and in other situations the retrieved material with supplement the generic material. Process 809 sends the personalized media to print control. In one embodiment, the system will be instructed to obtain customized input data from a location via Process 813. This location can be the initiator's own computer, some other storage device or even a live sensor(s) located remote from the initiator. The remote sensor then allows for the customization to be of "real-time" data, such as temperature, weather conditions, biometrics, pictures, etc. This real-time data can be delivered as a link to a data storage device, or to a processor, and can be fed on a continuous basis upon call from the publisher. For magazines this might be a one-time call per issue, but for electronic media, such as that provided by a server the personalized updates can be continuous and can depend upon static sensors at a single location or upon multiple sensors, or upon movement of the initiator (or some designee(s)) or upon some other selected target, such as a boat, storm conditions, traffic conditions, etc. In this manner, a game, or other media can be continuously changed by external events that might be random, or might be dependent upon some action, words spoken or other activity of the initiator (or designee(s)).

Process 810 delivers the media to recipients by, for example, placing proper addressing on a mailing label being certain to make sure that customized media for a particular recipient, such as for recipient R01, has a mailing label specific for that recipient.

Optionally, once the media is delivered, particularly for electronic delivery, it is possible for a return message to be communicated for the recipient to the initiator. Processes 811 and 812 handle this function, if available.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of controlling the delivery of a plurality of electronic video games among a plurality of possible recipients, said recipients independent from each other such that each said recipient may receive generic portions of a delivered electronic video game in common with other recipients, and such that each said recipient is also available to receive personalized portions of a delivered electronic game independent from any other recipient, said method comprising:
- storing said electronic video game in a server, said server remote from said recipients;
- distributing from said server, a particular electronic version of said video game to a particular one of said possible recipients, said distribution controlled, at least in part, by data from an initiator associated with said particular recipient;
- communicating a specific request pertaining to said particular recipient from said initiator associated with said particular recipient to said server; said specific request including data received from a source of continuously updating real-time data; and
- modifying, prior to said distributing step, said particular electronic version of said video game distributed to said particular recipient, said modifying controlled at least in part by said communicated specific request from said initiator and said modifying serving to personalize said electronic video game in accordance with said specific request.

2. The method of claim 1 wherein said modifying is dependent upon data specific to said particular recipient.

3. The method of claim 1 wherein said data communicated from said initiator is dependent on preferences of said particular recipient, said preferences selected from the list including sound, smell.

4. The method of claim 1 wherein said data communicated from said initiator is dependent on messages received from said initiator.

5. The method of claim 1 wherein said game is personalized for said particular recipient by substituting video images of real people or real animals known by said particular recipient as controlled by said communicated request from said initiator.

6. The method of claim 5 wherein said substituted images are, at least in part, determined by directing said server to a source of real-time customized input data from a location.

7. The method of claim 5 wherein said substituted images are, at least in part, determined by movement of a selected target.

8. The method of claim 1 wherein a theme for a particular game is communicated to said particular initiator prior to said time to distribute said game to a particular recipient and wherein said particular game is modified in accordance with said theme under control of said communicated request.

9. The method of claim 1 wherein said communicated request directs said server to stored images of people known to said particular recipient, said images stored remote from said recipient.

10. The method of claim 9 wherein said stored images are modified by data originating from said particular recipient.

11. The method of claim 1 wherein a plurality of recipients may have the same initiator.

12. The method of claim 1 wherein a particular recipient has a plurality of initiators.

13. The method of claim 1 wherein a plurality of initiators may receive communications pertaining to a single recipient.

14. The method of delivering video game controlling media from a server remote from a plurality of possible video game playing recipients to selected ones of any of said recipients, said recipients independent from each other, said method comprising:
- determining if it is time to distribute video game controlling media to any of said recipients;
- compiling generic video game controlling media specific to a particular video game to be distributed;
- determining which ones of said possible recipients is to receive said particular generic video game media;
- determining if there is a personalization required to said generic video game media for a particular recipient;
- delivering said generic video game media to all said possible recipients where a said personalization is not required;
- retrieving personalization data for each recipient determined to have a required personalization, said personalization specific to a particular recipient;
  - delivering said generic video game media to said particular recipient; and where said personalization data is identified by an initiator associated with said recipient to which said video game media is delivered and is dependent at least in part upon continuously updating real-time data.

15. The method of claim 14 further comprising the step of providing a feedback message to said initiator from said last-mentioned recipient.

16. The method of claim 14 wherein a plurality of recipients may have a common initiator.

17. The method of claim 14 wherein a recipient may have a plurality of initiators.

18. The method of claim 14 wherein said initiator may be associated with a plurality of recipients.

* * * * *

UNITED STATES PATENT AND TRADEMARK OFFICE
CERTIFICATE OF CORRECTION

| | |
|---|---|
| PATENT NO. | : 11,402,967 B1 |
| APPLICATION NO. | : 16/734765 |
| DATED | : August 2, 2022 |
| INVENTOR(S) | : Mary C. Tannenbaum |

It is certified that error appears in the above-identified patent and that said Letters Patent is hereby corrected as shown below:

In the Specification

At Column 3, Line number 67, delete "initiator 102" and replace with --initiator I02--.
At Column 4, Line number 44, delete "initiator 102" and replace with --initiator I02--.
At Column 4, Line number 52, delete "recipient 102" and replace with --recipient I02--.

In the Claims

At Column 8, Claim number 15, Line number 38, delete "the step of" and replace with --the step of:--.

Signed and Sealed this
Twentieth Day of December, 2022

*Katherine Kelly Vidal*

Katherine Kelly Vidal
*Director of the United States Patent and Trademark Office*